United States Patent [19]

Hermans

[11] 3,980,011

[45] Sept. 14, 1976

[54] STERILIZING APPARATUS COMPRISING A PRESSURE REDUCING VALVE

[75] Inventor: Willem Frederik Hermans, Amstelveen, Netherlands

[73] Assignee: Stork Amsterdam B.V., Amstelveen, Netherlands

[22] Filed: Aug. 12, 1975

[21] Appl. No.: 603,953

[30] Foreign Application Priority Data

Aug. 14, 1974 Netherlands .................... 7410908

[52] U.S. Cl. ............................................. 99/453
[51] Int. Cl.² ........................................ A23C 3/02
[58] Field of Search ............ 99/452, 453, 467, 359

[56] References Cited
UNITED STATES PATENTS

| | | | |
|---|---|---|---|
| 2,815,289 | 12/1957 | Murray | 99/452 X |
| 2,846,320 | 8/1958 | Wittwer | 99/453 |
| 2,971,453 | 2/1961 | Kintner | 99/452 X |
| 3,150,713 | 9/1964 | Loliger | 99/452 X |
| 3,156,176 | 11/1964 | Wakeman et al. | 99/453 |
| 3,231,009 | 1/1966 | Loliger | 99/452 X |
| 3,251,405 | 5/1966 | Hallstrom | 99/452 X |
| 3,450,022 | 6/1969 | Engel | 99/453 |
| 3,533,840 | 10/1970 | Holm | 99/452 X |

*Primary Examiner*—Peter Feldman
*Assistant Examiner*—Arthur O. Henderson
*Attorney, Agent, or Firm*—Watson, Cole, Grindle & Watson

[57] ABSTRACT

An apparatus for sterilizing a liquid by means of steam injection, comprising a conduit with a liquid supply, at least one steam injector, a pressure reducing valve and an expansion vessel. The valve consists of a circular plate with a spindle extending through the wall of the conduit by means of two sealings between which a chamber is formed having an inlet and an outlet for a sterilizing medium.

2 Claims, 2 Drawing Figures

3,980,011

STERILIZING APPARATUS COMPRISING A PRESSURE REDUCING VALVE

DISCUSSION OF THE PRIOR ART

This invention relates to apparatus for sterilizing a liquid by means of steam injection, comprising a liquid supply pipe into which one or more steam injectors emerge. One end of the pipe is in an expansion vessel, upstream of which a pressure reducing valve is mounted in the supply pipe. The reducing valve consists of a valve housing with a valve body, the latter being secured to a movable spindle protruding through a sealing in the wall of the housing. Such an apparatus, which itself is known, is particularly used for sterilizing foodstuffs, like milk products, whereby on the high pressure (HP) side of the system a pressure P1 prevails ranging e.g. from 3½ to 6 atmospheres overpressure, which pressure is reduced in the throttle valve to a pressure P2 less than 1 atmosphere absolute. On the low pressure (LP) side of the system there will therefore prevail a sub-atmospheric pressure. This is necessary to have the injected vapor escape again by boiling at a low pressure.

The pressure reducing valve used in such an apparatus contains a valve body secured to a movable spindle. Leakage of non-sterile air can be produced along the sealing in the wall of the valve housing. The product flowing towards the valve is already sterile due to the steam injection. The problem encountered with such a valve is that care is required in keeping the product also sterile during its passage through the valve.

SUMMARY OF THE INVENTION

The invention provides a solution for this problem which object is achieved with the movable spindle mounted on the high pressure (HP) side of the valve housing. The valve opens in the flow direction, and the sealing of the valve spindle is provided with a chamber to which is connected a feeding pipe for hot water or steam at a lower pressure than the feed pressure of the liquid to be sterilized. The chamber also comprises a discharge pipe for water or condensate.

With this arrangement of the movable spindle and the indicated pressure ratios, the sterile product tends to flow outwardly via the sealing as opposed to leakage from the outside inwardly. By using a chamber with a connection for hot water or steam, the spindle is kept sterile and the portion of the spindle penetrating into the high pressure space of the valve does not cause any contamination of the product.

The invention is concerned not with whether the product leaks to the outside or that leaking-air penetrates the system, but in maintaining the product within the system sterile.

BRIEF DESCRIPTION OF THE DRAWINGS

FIG. 1 shows part of the sterilizing apparatus in accordance with the invention; and.

FIG. 2 is a section of the reducing valve shown in FIG. 1.

DESCRIPTION OF A PREFERRED EMBODIMENT

Figures 1, 2:
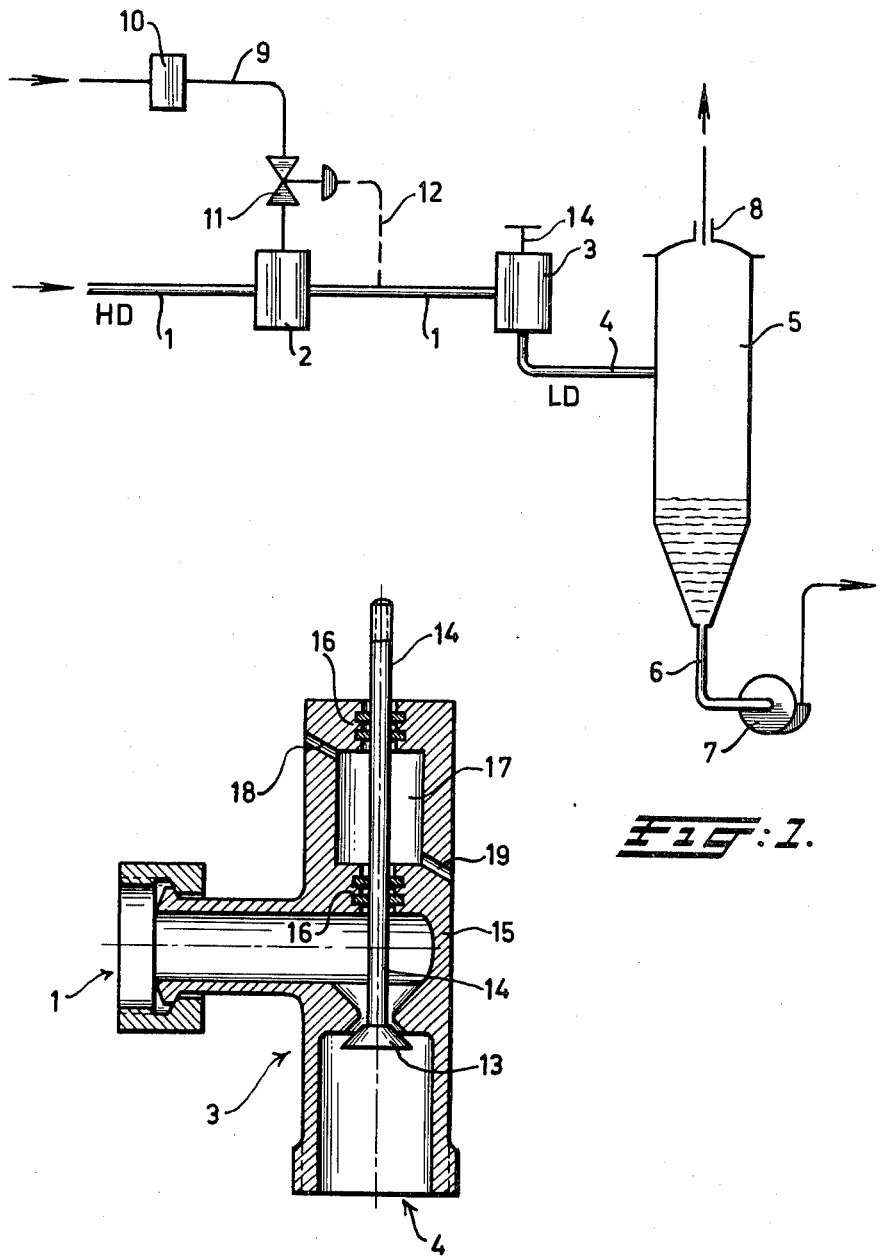

The apparatus comprises a feeding pipe 1 for the liquid to be sterilized, for example milk, into which one or more steam injectors 2 emerge. The supply pressure P1 may range from 3½ to 6 atmosphere absolute. The pipe 1 ends in a pressure reducing valve 3, the low pressure (LP) pipe 4 of which is connected to an expansion vessel 5 having a pressure P2. Expansion vessel 5 has on its underside a discharge pipe 6 with a pump 7. At its upper end the vessel 5 has an opening 8 for discharging vapour. The injector 2 is connected to a steam pipe 9 in which a filter 10 and a shut off valve 11 are disposed. This shut off valve is automatically operated by a signal via the connection 12 coming from pipe 1 at a location situated downstream of the injector 2.

With respect to FIG. 2, reducing valve 3 is provided with an obturator 13 secured to a movable spindle 14. Spindle 14 is disposed on the HP side of the valve housing 15 and protrudes from the housing via two sealing zones 16, situated at some distance from each other. Between these zones 16 an annular chamber 17 is provided with two opposite connections 18 and 19 for the supply and discharge of a sterilizing medium.

In the operation of the apparatus steam or hot water with a pressure $P3 < P1$ will be supplied via connection 18 and hot water or condensate will flow off via connection 19. The product flowing through valve 3 in the direction S will remain sterile during its passage. Due to the arrangement of the spindle 14 and the provision of the chamber 17 at most two phenomena may occur. The sterilized product may escape from the interior of housing 15 to chamber 17, whereby evidently no contamination of the product within the system will occur. The other phenomena is that a portion of spindle 14 penetrates from the chamber 17 into the HP space of the valve. This spindle portion, however, is sterilized due to its dwelling in chamber 17 and cannot possibly contaminate the product.

What is claimed is:

1. An apparatus for sterilizing a liquid by means of steam injection, comprising: a feed pipe for the liquid into which one or more steam injectors open, an expansion vessel into which said pipe extends, a pressure reducing valve being disposed in said feed pipe upstream of said expansion vessel and including a valve housing provided with a valve body, the latter being secured to a movable spindle mounted on the high pressure side of said valve housing and sealingly protruding through the wall of the housing through a first chamber, said spindle controlling the flow of said liquid to said expansion vessel, a feed pipe for hot fluid under a pressure lower than the supply pressure of the liquid to be sterilized and being connected to said first chamber, and a discharge pipe for fluid condensate being connected to said first chamber.

2. Apparatus as in claim 1, wherein said spindle is movable in the flow direction of the liquid during the opening of said pressure reducing valve, said pressure reducing valve further including two sealing zones in spaced relationship from each other for sealing the entrance and exit of said spindle with said first chamber and a second chamber for interconnecting said feed pipe with said expansion vessel, and said spindle extending through said high pressure side and through said two sealing zones and said first chamber, said spindle further including an obturator mounted on the end of said spindle extending into said second chamber.

* * * * *